United States Patent [19]

Allshouse et al.

[11] 4,280,414
[45] Jul. 28, 1981

[54] ANTI-VANDALISM, SECTIONALIZED PANEL, OUTSIDE METAL GUARD FOR WINDSHIELD

[76] Inventors: Roger S. Allshouse, Plainfield; Donald C. Marek, Hickory Hills, both of Ill.

[21] Appl. No.: 90,773

[22] Filed: Nov. 2, 1979

[51] Int. Cl.³ .......................... F41H 5/00; E06B 3/30
[52] U.S. Cl. .................................. 109/49.5; 52/203; 296/95 C; 89/36 L
[58] Field of Search ................ 109/49.5; 52/202, 203; 49/57; 296/95 C, 95 R; 89/36 L

[56] References Cited

U.S. PATENT DOCUMENTS

| 641,324 | 1/1900 | Read | 49/62 |
|---|---|---|---|
| 1,148,012 | 7/1915 | Elliott | 49/57 |
| 1,242,940 | 10/1917 | Hopper | 49/460 |
| 1,407,856 | 2/1922 | Gugino | 89/36 L |
| 2,012,388 | 8/1935 | Goodman | 52/202 |
| 3,421,259 | 1/1969 | Egan | 52/203 |
| 3,855,898 | 12/1974 | McDonald | 109/49.5 |
| 3,912,323 | 10/1975 | Dancik | 296/95 R |
| 4,006,933 | 2/1977 | Simpson | 296/95 R |
| 4,137,983 | 2/1979 | Gray | 49/463 |

Primary Examiner—Reinaldo P. Machado
Attorney, Agent, or Firm—John W. Gaines; Ronald C. Kamp; F. David AuBuchon

[57] ABSTRACT

A sectionalized panel of metal for guarding exposed windows on vehicle cabs and passenger compartments to protect from vandalism such as stone throwing. It serves on the outside as a stone-shield or night guard particularly for tractor cab windshields and is comprised of overlapping, interlockable, metal cladding plate sections which resemble a closed louver when installed and which are readily detachable and are hung below the windshield on the outside of the tractor cab when stored.

14 Claims, 7 Drawing Figures

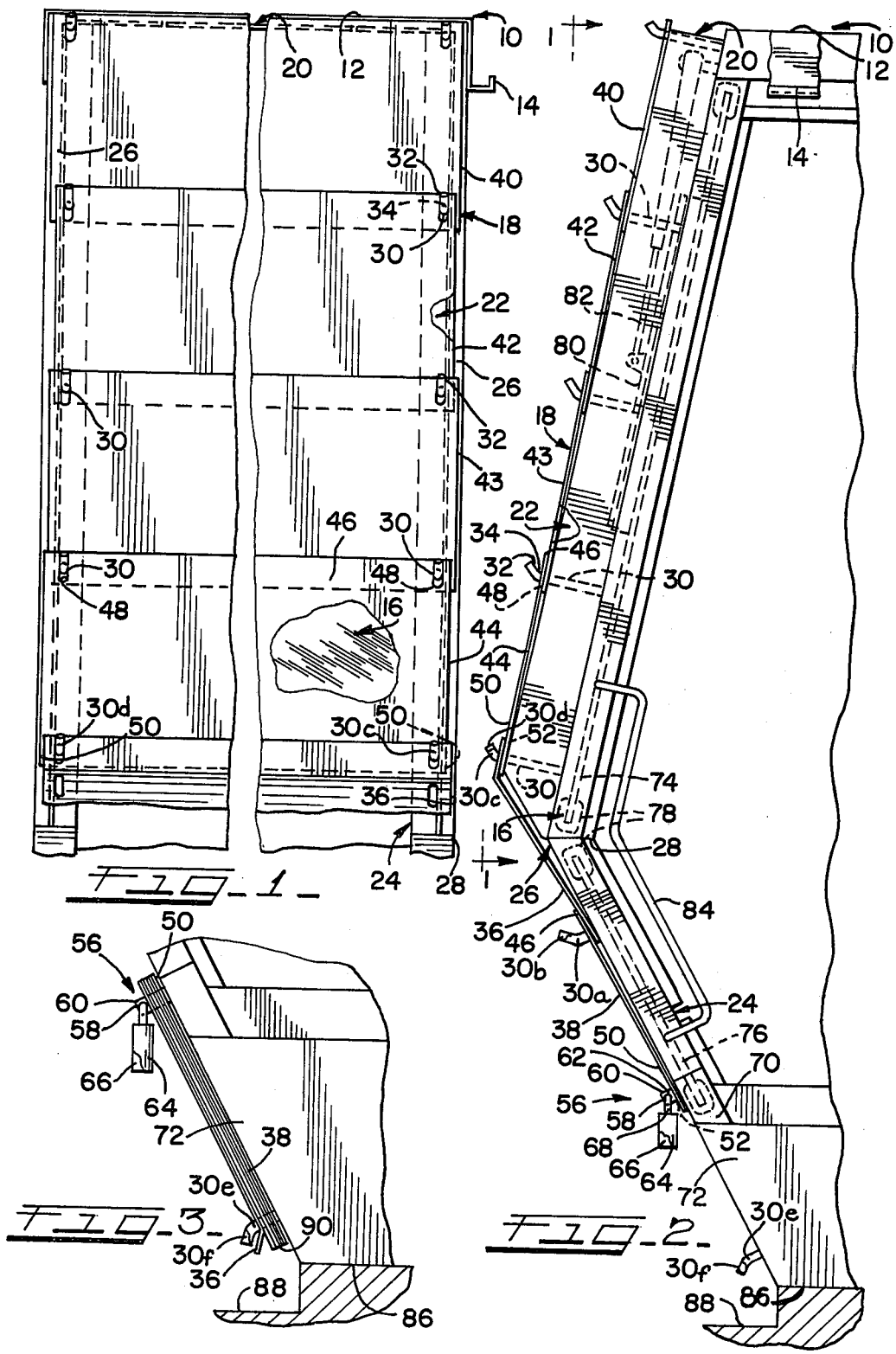

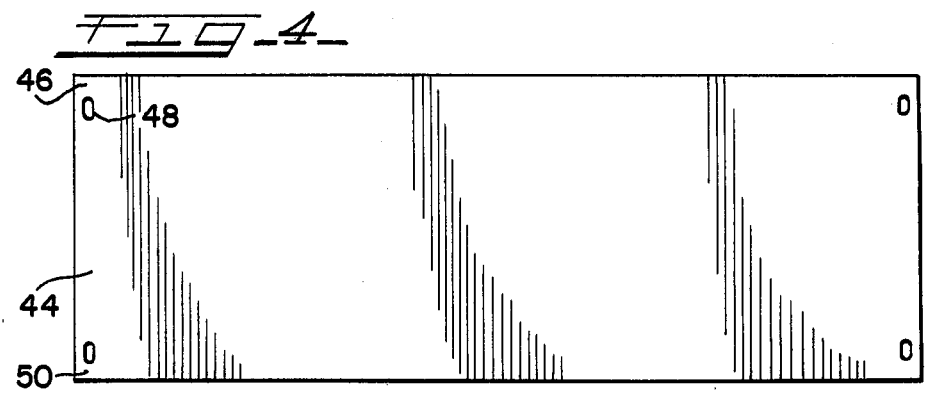
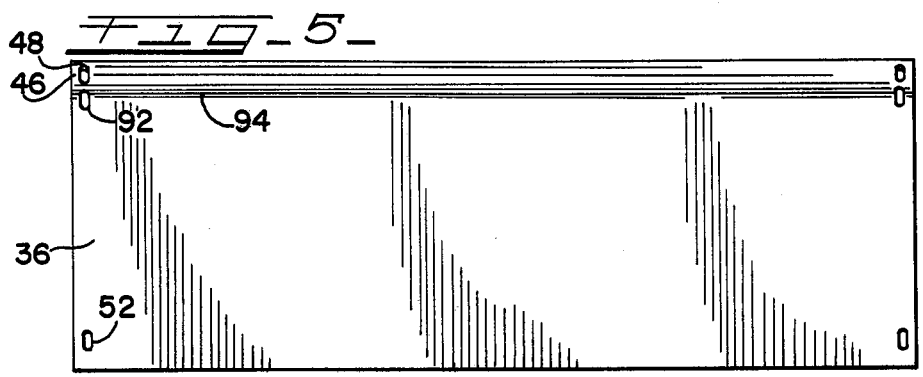
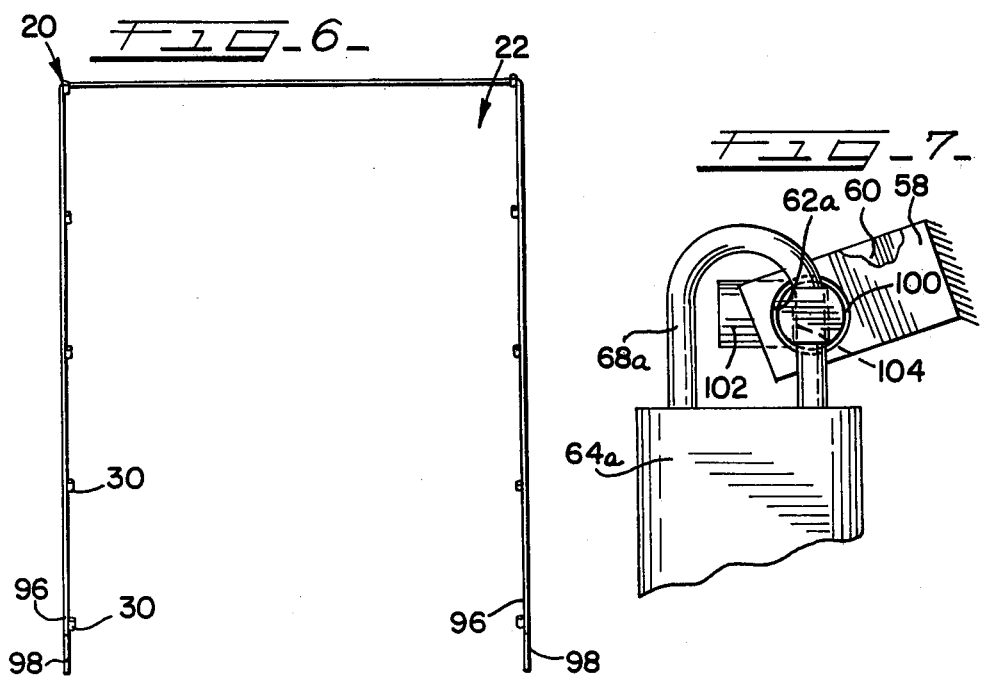

ANTI-VANDALISM, SECTIONALIZED PANEL, OUTSIDE METAL GUARD FOR WINDSHIELD

This application relates to a sectionalized panel of metal for guarding the exterior of windows in the cab or passenger compartment of vehicles, for protection against acts of vandalism such as stone throwing.

It more particularly relates to a stone-shield or a night guard for tractor cab windshields comprising overlapping, interlockable, metal cladding plate sections which resemble a closed louver when installed and which are readily detachable and are hung below the windshield and on the outside of the tractor cab when stored. A padlock or two provide the securement preventing removal of any plate section both when installed in guarding position and when stored.

U.S. Pat. No. 4,137,983 is a teaching of a panel closure for a tractor compartment to provide access, but having nothing to do with glass in the cab of tractors or other cab structure. There is nothing taught in the patent about padlocking or interlocking or overlapping of panel sections in operative windshield guarding position, or handily storing same in a padlocked, adjacent outside position.

U.S. Pat. No. 641,324 is a teaching of shields provided over house windows to protect against breakage by stones, but not intended for protection of tractor windshields. There is no teaching in the patent of an overlapping interlock between metal cladding plate sections which are padlocked in their operative, windshield guarding position and which are padlocked in a conveniently stored position outside and adjacent the windshield without obstructing same.

Additional prior art in pertinent categories including but not limited to U.S. Class 49 Subclasses 62,463 includes but is not limited to U.S. Pat. Nos. 1,148,012, 1,242,940, and 4,006,933.

Window covers in general, such as in the referred U.S. Pat. Nos. 641,324 and 1,242,940 are particularly well adapted to windows which open, and problems arise in respect of fixed windows such as the large windshields in cabs of sizable tractors. A metal cover can readily be built of a large size suitable for the tractor, but the storage disadvantage and the cumbersomeness of the cover offer little inducement for the tractor operator to retrieve it from some unhandy compartment and install it at the end of the work shift as a night guard. The foregoing impediment to easy and daily use of winshield night guard is materially reduced if not eliminated by use of our sectionalized panel having convenient operating and stored positions practically at the same place on the outside of the tractor, all as will now be explained more in detail. Features, objects and advantages will be particularly pointed out or become readily apparent when, for a better understanding of the invention, reference is made to the following written description taken in conjunction with the accompanying drawings which show a preferred embodiment thereof and in which:

FIGS. 1 and 2 are respective front face and left side views in elevation of a tractor cab with a windshield night-guard thereon embodying the present sectionalized panel invention, and shown secured in operational position by means of dual padlocked, apertured anchoring means;

FIG. 3 is a fragmentary view similar to FIG. 2 but showing the padlocked, stored position;

FIG. 4 is a face view of a typical flat plate section of the sectionalized panel;

FIG. 5 is a developed face view of the single bent plate section;

FIG. 6 is similar to FIG. 1, but with all other parts omitted to fully expose a U-shaped cowl and J-hooks for the guard; and FIG. 7 shows a modified apertured anchoring means employing a single padlock.

More particularly, FIGS. 1 and 2 of the drawings illustrate the forefront of a windshield-equipped crawler tractor cab 10. A risk involved in leaving crawlers overnight in open construction areas and also in areas closed off, is vandals' acts of breaking glass, particularly the crawler windshield. The risk is sometimes higher during daylight of non-working days such as holidays and weekends.

The cab has a metal roof 12 equipped with a rain gutter 14 along a side and having, beneath the front edge of the roof 12, a generally vertically disposed, laminated, multi-sectional glass windshield 16 which is especially vulnerable to the impact of thrown objects.

According to the invention, I provide an outside windshield guard 18 spaced to varying degrees forwardly of the windshield 16, and also a forwardly projecting U-shaped fence or cowl generally indicated at 20 so as to close off the sides of the resulting space 22 covered by the outside guard 18.

The structure 24 defining the front windowframe of the cab 10 includes the roof 12 at the top and, at the opposite sides, a pair of multi-sectional body A-pillars 26 in which the sections are angled at about 38° from another at a junction 28 in each pillar.

In the operative position shown of the sectionalized panel guard 18, the individual cover plates or panels or panel sections are hung from the upturned end of pairs of J-hooks 30, disposed so as to line the opposite sides of the frame structure 24 and securely welded at their fixed ends to the roof 12 and to the two A-pillars 26, respectively. An upturned straight end section 32 is deflected in a vertical plane approximately 44° upwardly from the main body axis of each forwardly projecting J-hook 30, so as to form a juncture 34 therewith providing the actual attachment point or hook to receive these sections.

The fence or cowl 20 follows generally along the line of J-hooks, on the outside.

The panel sections include a single bent section 36, a flat last section or bottom section 38, and also flat top 40, next to top 42, third from top 43, and fourth from top 44 sections identical to the flat bottom section 38.

A so-called attached end 46 of the flat sections, as typified by the fourth from the top section 44, appears uppermost as viewed in FIGS. 1 and 2; that typical attached end 46 has a pair of slotted hook openings 48 with which the section 44 receives the adjacent upturned J-hooks 30 and by which the section is suspended in pending relationship from the hooks. According to the present panel section interlock as typified by section 44, the attached end 46 of the latter overlaps with and holds down the depending free end of the immediately preceding panel section (43) thereabove, whereas a depending free end 50 on the fourth from the top section 44 is overlapped by and held disengagably down under the adjacent end of the immediately succeeding (36) panel section therebelow. For the latter purpose, the free end 50 of section 44 in a way typical of the other panel sections has a pair of hook openings 52

(FIG. 2), which pair readily receives the adjacent pair of J-hooks 30 when the section 44 during installation is swung about its attached end along an arc 54, and which pair allows the free end 50 to lie flush and accommodate the next succeeding section in underlying relation thereto.

BENT AND BOTTOM SECTIONS—FIG. 2

A first pair of the upturned J-hooks specially designated 30a and 30b is hooked onto and suspends the attached end 46 of the last one or bottom section 38 so as to overlap with and hold down the free end of the companion bent panel 36. The bent panel 36 in turn is suspended from a second pair of the upturned J-hooks specially designated 30c and 30d.

To complete the securement of all panel sections against dislodgement, a padlocked apertured anchoring means 56 is provided for receiving the bottom pair of hook openings 52 in the depending free end 50 of the bottom section 38, and comprises a pair of flat metal ears 58 and 60 with coaxial lock openings 62 and disposed at or adjacent the bottom edge of the frame opening at its opposite sides. Also at the opposite sides are dual padlocks 64 and 66 each locked with its shackle 68 lodged in one of the coaxial lock openings 62.

MULTI-SECTIONAL CAB WINDSHIELD 16—FIG. 2

The front cab portion 70 adjacent its lower platform 72 closes off the bottom of the windowframe structure, and cooperates with the A-pillars 26 and roof 12 to support therein the respective upper 74 and lower 76 sections of the windshield 16. Conventional glass receiving rubber frames 78 in the frame opening are supported by the metal flanges thereof for yieldably carrying the glass sections 74 and 76, thereby closing off the opening air-tight and water-tight.

CAB FOREFRONT HARDWARE—FIG. 2

The liberally provided covered space 22 affords adequate clearance between the outside guard 18 and the wiper blade 80 of conventional windshield wiper mechanism or mechanisms. For each mechanism a wiper arm 82 oscillates the blade 80 over an arcuate sector and the mechanism has the wiper arm motor, not shown, preferably although not necessarily applied as a standard inside-mounted installation within the cab 10. The downwardly-closed, louver appearance of the guard 18 over the space 22 imparts in the desired way a look of impervious, armored, rain-shedding integrity.

A rearwardly offset grab handle 84 is carried by the near one of the A-pillars 26 on the outside of the cab 10.

The cab 10 is carried in an upright position at the mid section of a crawler tractor 88, with the bottom of the cab lower platform indicated at 86 mounted on the tractor main frame illustrated.

STACK STORAGE—FIGS. 2 AND 3

A certain other pair 30e, 30f of J-hooks which are downturned as seen in these figures are secured oppositely to the first pair 30a 30b relative to the padlocked apertured means 56 at outside points secured to the cab lower platform 72. This disposition makes a symmetrical arrangement about 56.

For their storage throughout a working shift of the crawler, removal of all of the panel guard sections with release of the dual padlocks 64 and 66 enables the sections to be superimposed in a stack 90 (FIG. 3) with one of the flat sections such as the bottom one 38 at the bottom of the stack, with the bent section 36 at the top in the position illustrated, and with the stack in effect swung from the hooks 30e and 30f at their so-called attached ends so that each section is in effect inverted from its operative position.

The stack 90 has the free ends 50 of all sections superimposed and received in common over the padlocked apertured anchoring means 56, whereupon the padlocks 64 and 66 are relocked in their respective ears 58 and 60.

At end of the working shift, the sections are unlocked and removed from the stack 90, whereupon the guard is changed from the storage position of FIG. 3 to the operative position of FIG. 2 to complete the cycle. The windshield is protected at the front and sides.

The cycle is then repeated.

TYPICAL FLAT SECTION—FIG. 4

The section 44 illustrated in this figure is typical of the flat panel sections.

This flat section 44, and the others, are sheet steel 0.15 cm thick (16 ga., 0.059 in.), and with their longer dimension (width) 94 cm (37 in.). According to the slot pattern of the so-called upper pair of hook openings 48 in the attached end 46 and the bottom pair of hook openings 52 in the so-called free end 50 of the sheet, the slots are both longitudinally and transversely aligned. The upper openings 48 are 1.1 cm×1.9 cm long (7/16×¾ in.) slots; the bottom openings 52 are 1.1 cm×2.5 cm long (7/16×1 in.) slots.

BENT SECTION—FIG. 5

The illustrated panel section 36 is the sole bent section.

The section 36 is sheet steel 0.15 cm thick (16 ga., 0.059 in.) and with its longer dimension (width) 94 cm (37.0 in.). Being the same in that respect to the previous flat sections, the bent section 36 is also the same in the respect that the upper openings 48 in the attached end 46 thereof are 1.1 cm×1.9 cm long (7/16×¾ in.) slots; also the same are the pair of hook openings 52 in the bent section free end 50 which are 1.1 cm×2.5 cm long (7/16×1 in.) slots.

However, because the J-hook spacing is overlength between the pair 30c and 30d, not shown, and the pair 30a and 30b, not shown, another pair of attachment end hook openings 92 is provided which slightly intersects the eventual bend line 94 of the section 36 when bent and which is composed of 1.1 cm×1.9 cm long (7/16×¾ in.) storage slots.

The storage slots precisely conform with a slot pattern in section 36 in which the slots are all longitudinally and transversely aligned, and in which the spacing between the opening pair 92 and opening pair 52 corresponds with the spacing between the downturned J-hooks 30e and 30f for the former and the padlocked apertured anchoring means 56 for the free end openings 52.

The bent portion of attached end 46 of section 36 is deflected by an angle of 39° which is found satisfactory to conform with the tapered bottom end of the U-shaped fence 20, not shown, and to provide the desired armadillo-like shell fit desired.

COWL AND HOOK SUBASSEMBLY—FIG. 6

The pairs of J-hooks generally designated 30 are welded at their fixed ends to the roof and window frame structure, not shown, as already noted and are each tack welded at two or more points to the inside of the U-shaped fence or cowl 20 serving to space the windshield wiper, not shown, from the guard, when the latter is hooked over the projecting bent ends of the hooks 30.

The resulting space 22 is not essential toward the bottom of the cowl 20, which therefore at its leg extremities 96 has straight diagonal bevels 98. A satisfactory angle for the bevels 98 is 44° away from the surface of the leg extremities 96.

The straight bent end of each of the hooks 30 past its juncture 34, not shown, extends axially with a projected distance of approximtely 1.3 cm (0.5 in.) and its projected distance off the axis is 1.3 cm (0.5 in.). Each hook is made from steel rod stock 0.96 cm (0.38 in.) in diameter.

ANCHORING EARS—FIG. 2

Each of the ears 58 and 60 had a 0.8 cm (5/16 in.) diameter lock opening 62 and measured 2.5 cm (1 in.) long×1.9 cm (¾ in.) wide×0.96 cm (⅜ in.) thick. The material is flat steel sheet.

MODIFIED ANCHORING MEANS—FIG. 7

If the coaxial lock openings 62 of the anchoring means ears 58 and 60 are enlarged slightly in diameter, they can receive a locking rod 100 having a bent end 102 projecting in cantilever fashion just beyond the corresponding ear 60, and provided with a transverse lock hole 104 therein and projecting in cantilever fashion just beyond the corresponding ear 58.

Accordingly, as illustrated in the modification of FIG. 7, a single padlock 64a can be applied with its shackle 68a received in the transverse lock hole 104 so that the padlocked apertured anchoring means can secure the panel section or sections at their free end with only one padlock.

The present panel guard 18 because it is sectionalized is a quick and convenient means whereby a tractor operator as he locks the tractor cab or else unlocks it for a work shift, can conveniently install the panel by hanging the individual sections to cover the windshield completely or, in alternation, can remove the cover sections one by one and then stack and store same (just before unlocking the cab for a work shift).

Removal for the latter storage purposes requires of course keys for the padlocks. Because the padlocked apertured anchoring means are at or adjacent the lower edge of the window opening, the convenient storage position as shown in FIG. 3 keeps the stored stack 90 set off from obstructing in any manner the view of the operator through the tractor cab windshield 30.

The slot width and length dimensions hereinabove given represent a careful selection with sufficient tolerance for ease in operative position installation and storage position installation, but with insufficient tolerance or clearance to allow a vandal to slip out any plate from its armadillo-like plate fit and overlap.

The four slightly back-swept panel sections covering the upper windshield section 74 are shown to be in a flat plane parallel to the flat plane of the windshield section and spaced 10 cm (4 1/16 in.) forwardly therefrom; the reentrant angled, two panel sections covering the slightly forwardly tilted lower windshield section 76 are shown in a flat plane parallel to the flat plane of the latter and they are spaced 2.5 cm (1 in.) forwardly therefrom. It is evident clearances of this same order are desirable for bent windshield sections having a curved plane, and so the back tilted panel sections and reentrant angled panel sections if provided would likewise have complimentarily curved planes so as to afford about the same spacing.

In any case, the spacing afforded by the backwardly tilted panel sections will be about four times as great as the spacing provided by the reentrant angled sections so as to accommodate standard windshield wiper mechanism without encroachment. So also the drawings disclose J-hooks in which the bend juncture is, at most, an oblique angle, as opposed to certain hooks having a 180° or higher arc in the hook; self evidently, other hook junction, oblique angularities differing from the one illustrated can be suitably employed having preferably, but not always necessarily, greater than 90° angularity. The crucial geometry (FIG. 2) is that the fourth from top section 44 can swing about its attached end 46 along the arc 54 onto the J-hooks without interference from the upturned straight end section 32 of the J-hooks; conversely, the section 44 in its operative position as shown in FIG. 2 cannot be rotated about the free end 50 because the slot and J-hook proportions are such that the attached end slot 48 does not extend upwardly enough to clear the upturned straight end section 32 of the J-hook 30 receiving the slot and therefore the attached end 46 cannot move along the arc 100 about the section free end 50.

Variations within the spirit and scope of the invention described are equally comprehended by the foregoing description.

What is claimed is:

1. Windowframe structure (24) having, at least at the top and the opposite adjoining sides (26) of the frame opening, a generally U-shaped, outwardly projecting cowl (20);

a sectionalized panel (18) of imperforate metal closing off the outer end of the cowl; and a plurality of pairs of J-hooks (30) secured to said opposite sides of the frame opening and to the adjacent portions of the U-shaped cowl, said hooks having hook portions projecting outwardly beyond the cowl and suspending sections of said panel hooked thereon so that they are outwardly offset from the frame opening, and in sectionalized contiguously overlapped relation to mutually form an uninterrupted imperforate window guard.

2. Generally vertically disposed windowframe structure (24) having on the outside at least a first pair of J-hooks (30a, 30b or 30e, 30f) permanently secured generally one at each side of, and at least in adjacency to an extremety of, the frame opening;

one metal cover plate (38) having an attached end (46) provided with hook openings (48) secured against dislodgement on the J-hooks, and having a free end (50) spaced from the J-hooks and provided with fasten-down openings (52); and locking means engaged in the aperture of fixed apertured means (56) passing through each opening (52) in the free end of the cover plate (38) and locking same at its free end (50) to said structure.

3. The invention of claim 2, the locking means characterized by:

at least one padlock (64) locked in said aperture (62) of, and supported by, the fixed apertured means (56) and blocking any removal thereover of the fasten-down openings (52) from the latter.

4. The invention of claim 2, characterized by:

said one metal plate (38) secured on said J-hooks (30a, 30b) constituting the last plate of a cover for the frame opening;

a companion cover plate (36); and a second pair of J-hooks (30c, 30d) spaced from the first pair of J-hooks (30a, 30b) so as to be in an opposite relation to the fixed apertured means (58) and received in hook openings (48) of an attached end (46) of said companion plate (36) so as to secure the just said attached end (46) against dislodgement;

said last plate (38) padlocked at its free end (50) as aforesaid and having the fasten-down openings (52) on the companion plate free end received underneath the last plate (38) on the first pair of J-hooks (30a, 30b) so as to fasten down said free end of the companion plate (36) to prevent its dislodgement.

5. The invention of claim 3, characterized by:

another pair of permanently secured J-hooks (30e, 30f) oppositely disposed to the first pair (30a, 30b) relative to the apertured means (58) for an oppositely positioned locking arrangement whereby when the attached end of the one cover plate (38) is secured to the other pair (30e, 30f) and the free end (50) is spaced therefrom, the apertured means (56) can likewise pass through the fasten-down openings (52) and a padlock (64) in the apertured means can likewise lock the plate at its free end (50) to said structure.

6. The invention of claim 5, characterized by:

plural general similarly plates (40, 42, etc.) effective to establish cooperation as a sectionalized panel window overguard, and including said one plate (38);

said apertured means (56) and other pair of J-hooks (30e, 30f) being offset from the frame opening in their oppositely positioned locking arrangement to provide an outside storage position for said plural plates, said plural plates being superimposed in a stack (90) and hooked in common with the attached end (46) secured on said other pair of J-hooks (30e, 30f) and with the free end (50) in common padlocked along with said one plate (38) in the way described.

7. The invention of claim 2, characterized in fuller degree by:

plural generally similar plates (40, 42, etc.) forming a sectionalized panel overguard (18) as a substantially complete cover over said frame opening, said one plate (38) constituting the last plate of the complete cover;

pairs of J-hooks with the hooks (30) of each pair permanently secured one at each side of the frame opening, and corresponding in number and in position to the plural plates (40, 42, etc.) so as to suspend them by securing their attached ends (46) in place in the complete cover;

said last plate (38) padlocked at its free end (50) as aforesaid and each other plate having the fasten-down openings hooked on the J-hooks (30) suspending the next succeeding plate, but lying in registration beneath the attached end (46) of the latter so that such succeeding plate overlaps therewith and by its hooked-on presence as suspended fastens down the underlying free end to prevent its dislodgement.

8. The invention of claim 7, characterized by:

all such hook openings (48, 52) arranged according to the same general pattern from plate to plate.

9. The invention of claim 8, further characterized by:

at least one plate (36) having an extra pair of hook openings (48) accommodative of a nonuniformly located pair of J-hooks (30a, 30b) for the free end (50) thereof in which said extra pair is formed.

10. The invention of claim 8, further characterized by:

another pair of permanently secured J-hooks (30e, 30f) oppositely disposed to the first pair (30a, 30b) relative to the apertured means (56) for an oppositely positioned locking arrangement whereby, when the plural plates (36, 40, 38, etc.) are stacked (90) with all corresponding openings mutually in registry and when hooked in common with the attached end (46) secured on said second pair of J-hooks (30e, 30f), and when the free end (50) is spaced therefrom, the apertured means (56) can likewise pass through the mutually registering fasten-down openings (52) and a padlock (64) in the apertured means can likewise lock the stack of plates at the free end (50) to said structure.

11. The invention of claim 7, further characterized by:

said J-hooks (30) being in a line along opposite sides of the frame opening;

a side fence (20) following along the line of J-hooks and extending outwardly from the frame opening of the windowframe structure to a point past which the J-hooks project slightly therebeyond, thereby providing an outwardly offset support of said cover from the frame opening.

12. Method of cladding an area to be protected in windowframe structure by means of a sectionalized metal panel guard (18), wherein the frame (24) has affixed to the exterior thereof pairs of J-hooks for hanging the panel sections on the outside, said sections having openings including upper hook-receiving openings (48), said method comprising the steps of:

hanging the panel sections in sequence one-at-a-time on consecutive hook pairs (30), with the upper hook openings (48) of an attached end of each preceding section hooked securely to and suspended from a hook pair, and with the free end lying in registration beneath the attached end of the next succeeding panel section and with the fasten-down hook openings (52) therein received on the hook pair suspending each such next succeeding section, whereby each succeeding panel section overlaps therewith and by its hooked-on presence fastens down the underlying free end to prevent its dislodgement; and padlocking the free end of the last succeeding panel section to means (56) affixed to said exterior of the frame (24).

13. Method of outside storage utilized when the cladded area of windowframe structure is no longer to be protected by means of a sectionalized metal panel guard, wherein the structure (24) has affixed to the exterior thereof a certain pair (30e, 30f) of J-hooks, and wherein plural, generally similar, metal cover panel sections forming the guard have an attached end provided with hook openings and have a free end provided with fasten-down openings, the openings concerned arranged according to the same general pattern from section to section, said method comprising the steps of:

collecting and superimposing said panel sections in a stack (90) with all corresponding openings mutually in registry;

hooking the panel sections of said stack in common with the attached ends secured by their hook openings (48) on said certain J-hooks; and locking the panel sections of said stack in common with the free ends secured by padlocking (64) same with their fasten-down openings on fasten-down means (56) affixed to the exterior of said structure (24).

14. The invention of claim 13, wherein the window-frame structure (24) defines a frame opening disposed such that the fasten-down means is adjacent an extremity thereof, and wherein at least a first pair (30a, 30b) of J-hooks is spaced apart in the direction of the frame opening so as to be arranged one on each side of the frame opening and with the certain pair (30e, 30f) of J-hooks oppositely disposed to the first pair with respect to the fasten-down means, comprising the further steps of:

unlocking and removing at least one of the panel sections from the fasten-down means and certain pair of J-hooks;

positionally reversing and hanging a removed panel section on the first pair of J-hooks with the attached end (46) hooked securely to and suspended from the first J-hooks (30a, 30b); and padlocking the free end (50) to said fasten-down means (56).

* * * * *